(12) United States Patent
Nishimura et al.

(10) Patent No.: US 8,723,828 B2
(45) Date of Patent: May 13, 2014

(54) TOUCH SENSOR-EQUIPPED DISPLAY DEVICE

(75) Inventors: Tomohiko Nishimura, Osaka (JP); Jin Miyazawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 13/634,515

(22) PCT Filed: Mar. 3, 2011

(86) PCT No.: PCT/JP2011/054953
§ 371 (c)(1),
(2), (4) Date: Sep. 12, 2012

(87) PCT Pub. No.: WO2011/114901
PCT Pub. Date: Sep. 22, 2011

(65) Prior Publication Data
US 2013/0002597 A1    Jan. 3, 2013

(30) Foreign Application Priority Data

Mar. 17, 2010  (JP) ................... 2010-061414

(51) Int. Cl.
*G06F 3/041*    (2006.01)
(52) U.S. Cl.
USPC ........................................ 345/173
(58) Field of Classification Search
CPC ....... G06F 3/044; G06F 3/0412; G06F 3/041; G09G 3/3614; G09G 3/3648
USPC ........................................ 345/173
See application file for complete search history.

(56) References Cited

U.S. PATENT DOCUMENTS

| 5,606,346 | A | 2/1997 | Kai et al. | |
|---|---|---|---|---|
| 5,631,666 | A * | 5/1997 | Tagawa et al. | 345/104 |
| 8,243,027 | B2 * | 8/2012 | Hotelling et al. | 345/173 |
| 2007/0262966 | A1 | 11/2007 | Nishimura et al. | |
| 2010/0212974 | A1 * | 8/2010 | Kim | 178/18.03 |
| 2011/0157064 | A1 * | 6/2011 | Imai | 345/173 |

FOREIGN PATENT DOCUMENTS

JP    06-187096 A    7/1994
JP    2006-146895 A    6/2006

OTHER PUBLICATIONS

U.S. Appl. No. 13/634,516, filed Sep. 12, 2012.

* cited by examiner

*Primary Examiner* — Lixi C Simpson
(74) *Attorney, Agent, or Firm* — Chen Yoshimura LLP (57) ABSTRACT

Provided is a touch sensor-equipped display device that is not susceptible to the effect of noise caused by the reversal of polarity of the common voltage of the display device, without using special circuits. The touch sensor-equipped display device includes: a touch sensor unit 7 having a plurality of sensor electrodes; a sensor output read circuit 21 that is sequentially connected to the respective sensor electrodes and that outputs a signal voltage corresponding to the electrical characteristics of the sensor electrode connected thereto; a sensor control circuit 23 that supplies a control signal to the sensor output read circuit 21; and a coordinate calculation circuit 22 that detects a contact position on the basis of the signal voltage. The coordinate calculation circuit 22 includes: an averaging circuit 221 that calculates an average value for the signal voltage values outputted from the sensor output read circuit 21 over two cycles of the vertical synchronizing signal; and a contact position detection circuit 222 that detects the contact position on the basis of the average value.

7 Claims, 8 Drawing Sheets

TOUCH SENSOR-EQUIPPED DISPLAY DEVICE

TECHNICAL FIELD

The present invention relates to a display device provided with a touch sensor that can detect a position where a finger or the like has come into contact.

BACKGROUND ART

Conventionally, touch sensor-equipped display devices provided with a touch sensor (also referred to as a touch panel) on the front surface (viewer side) of a display have been used in various applications. The touch sensor is an input device that makes possible operation commands or data input by detecting a position where a finger, a stylus, or the like has come into contact. In terms of the methods of position detection, the capacitance coupling type, the resistive film type, the infrared type, the ultrasonic type and the electromagnetic inductive/coupling type are known.

When using a touch sensor integrally with a display device, there is a problem that the touch sensor receives noise from the display device, resulting in decreased position detection accuracy of the touch sensor. If the display device uses a liquid crystal panel, for example, an induced voltage occurs in position detection conductive films of the touch sensor, due to a common voltage applied to an opposite electrode of the liquid crystal panel. This induced voltage is the cause of the noise.

A configuration for eliminating such noise is disclosed in Japanese Patent Application Laid-Open Publication No. 2006-146895, for example. A touch sensor-equipped display device disclosed in the publication is provided with a strobe signal generation circuit and a noise reduction current signal generation circuit. The strobe signal generation circuit generates a strobe signal in synchronization with a polarity reversal period of a common voltage supplied to an opposite electrode. The noise reduction current signal generation circuit generates a noise reduction current signal, which is obtained by eliminating, based on the strobe signal, prescribed portions from the current that flows from terminals connected to a touch sensor part.

According to this conventional configuration, noise occurring in an output current of the position detection conductive films resulting from a periodic polarity reversal in the common voltage is eliminated using the strobe signal. As a result, the S/N ratio of the touch sensor output is improved, thus improving the position detection accuracy.

However, with the above-mentioned conventional configuration, specialized circuits for removing noise such as the strobe signal generation circuit and the noise reduction current signal generation circuit are needed, thus making the configuration complex.

SUMMARY OF THE INVENTION

An objective of the present invention is to provide a touch sensor-equipped display device that is not susceptible to the effect of noise caused by a polarity reversal of a common voltage in the display device without the use of a strobe signal generation circuit or a noise reduction current signal generation circuit.

In order to fulfill the above-mentioned objective, a touch sensor-equipped display device according to one embodiment of the present invention includes: a display panel that has an active matrix substrate having a plurality of pixel electrodes, a display medium layer, and an opposite substrate having an opposite electrode that faces the plurality of pixel electrodes; a display panel driver circuit that supplies a display signal voltage to the plurality of pixel electrodes, the display panel driver circuit also supplying a common voltage that exhibits a periodic polarity reversal to the opposite electrode; a touch sensor part that is disposed on a surface of the display panel on the side of the opposite substrate, the touch sensor part having a plurality of sensor electrodes that exhibit a change in electrical characteristics when a contacting body comes into contact; a sensor output read circuit that is sequentially connected to the respective sensor electrodes, the sensor output read circuit outputting a signal voltage based on the electrical characteristic of the sensor electrode connected thereto; a sensor control circuit that supplies a control signal to the sensor output read circuit; and a coordinate calculation circuit that detects a position where the contacting body has come into contact in the touch sensor part based on the signal voltage outputted from the sensor output read circuit, wherein the control signal includes a signal that sequentially connects each of the sensor electrodes in the touch sensor part to the sensor output read circuit during one period of a vertical synchronization signal supplied to the display panel driver circuit, and wherein the coordinate calculation circuit includes an averaging circuit that calculates an average value of signal voltage values outputted from the sensor output read circuit over two periods of the vertical synchronization signal, and a contact position detection circuit that detects the position where the contacting body has come into contact in the touch sensor part based on the aforementioned average value.

According to the present invention, a touch sensor-equipped display device that is not susceptible to the effect of noise caused by a polarity reversal of a common voltage in the display device without the use of specialized circuits such as a strobe signal generation circuit or a noise reduction current signal generation circuit can be provided.

BRIEF DESCRIPTION OF THE DRAWINGS

FIG. 2 is a schematic drawing that shows a configuration of a touch sensor-equipped display device according to Embodiment 1, and in particular, the connective relation thereof with driver circuits and the like.

DETAILED DESCRIPTION OF EMBODIMENTS

A touch sensor-equipped display device according to one embodiment of the present invention includes: a display panel that has an active matrix substrate having a plurality of pixel electrodes, a display medium layer, and an opposite substrate having an opposite electrode that faces the plurality of pixel electrodes; a display panel driver circuit that supplies a display signal voltage to the plurality of pixel electrodes, the display panel driver circuit also supplying a common voltage that exhibits a periodic polarity reversal to the opposite electrode; a touch sensor part that is disposed on a surface of the display panel on the side of the opposite substrate, the touch sensor part having a plurality of sensor electrodes that exhibit a change in electrical characteristics when a contacting body comes into contact; a sensor output read circuit that is sequentially connected to each sensor electrode, the sensor output read circuit outputting a signal voltage based on the electrical characteristic of the sensor electrode connected thereto; a sensor control circuit that supplies a control signal to the sensor output read circuit; and a coordinate calculation circuit that detects a position where the contacting body has come into contact in the touch sensor part based on the signal voltage outputted from the sensor output read circuit, wherein the control signal includes a signal that sequentially connects each of the sensor electrodes in the touch sensor part to the sensor output read circuit during one period of a vertical synchronization signal supplied to the display panel driver circuit, and wherein the coordinate calculation circuit includes an averaging circuit that calculates an average value of signal voltage values outputted from the sensor output read circuit over two periods of the vertical synchronization signal, and a contact position detection circuit that detects the position where the contacting body has come into contact in the touch sensor part based on the aforementioned average value.

According to this configuration, it is possible to eliminate noise that occurs with the polarity reversal of the common voltage without the use of specialized circuits for noise removal. Reasons are as follows. Over one period of the vertical synchronization signal, the polarity of the common voltage reverses from negative to positive in synchronization with a fall of the vertical synchronization signal (switching from high level to low level). During the next period of the vertical synchronization signal, the polarity of the common voltage reverses from positive to negative in synchronization with the fall of the vertical synchronization signal. Therefore, the noise that the output signal value obtained in the first period receives due to the polarity reversal of the common voltage and the noise that the output signal value obtained in the second period receives due to the polarity reversal of the common voltage are at opposite polarity. Therefore, by finding the average values of the output signal values obtained in the first period and the output signal values obtained in the second period in the averaging circuit, it is possible to cancel out the noise resulting from the polarity reversal of the common voltage.

Therefore, according to the above-mentioned configuration, it is possible to provide a touch sensor-equipped display device that is not susceptible to the effect of noise resulting from a polarity reversal of a common voltage in the display device without the use of specialized circuits such as a strobe signal generation circuit or a noise reduction current signal generation circuit.

In the above-mentioned configuration, it is preferable for the averaging circuit to calculate the average value of a signal voltage outputted from the sensor output read circuit in the first period of the two periods of the vertical synchronization signal, and a signal voltage outputted from the sensor output read circuit during the second period of the two periods of the vertical synchronization signal. The averaging circuit may calculate the average value every two periods of the vertical synchronization signal or every one period of the vertical synchronization signal.

It is preferable for a touch sensor-equipped display device according to the present embodiment to have a configuration, wherein the sensor electrodes include a first sensor electrode group in which a plurality of sensor electrodes are lined up in a first axis direction of coordinates in the touch sensor part, and a second sensor electrode group in which a plurality of sensor electrodes are lined up in a second axis direction of the coordinates in the touch sensor part, and wherein the coordinate calculation circuit determines the first axis direction coordinate of the position where the contacting body has come into contact based on the signal voltage outputted by the sensor output read circuit when a sensor electrode belonging to the first sensor electrode group is connected thereto, and determines the second axis direction coordinate of the position where the contacting body has come into contact based on the signal voltage outputted by the sensor output read circuit when a sensor electrode belonging to the second sensor electrode group is connected thereto.

The touch sensor-equipped display device according to the present embodiment may have a configuration, wherein the polarity of the common voltage reverses every one horizontal period, or the polarity of the common voltage reverses every two horizontal periods.

Embodiment 1

An embodiment of the present invention will be described in detail below with reference to the drawings. Parts in the drawings that are the same or correspond to parts already described are assigned the same reference characters, and descriptions thereof will not be repeated.

Figure 1:
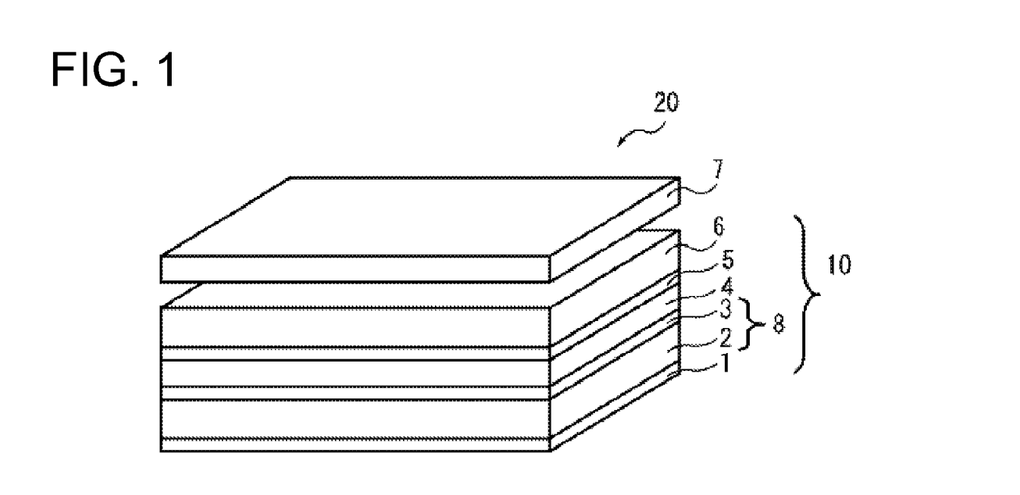
FIG. 1 is a schematic drawing that shows a configuration of a touch sensor-equipped display device according to one embodiment of the present invention.
Figure 2:
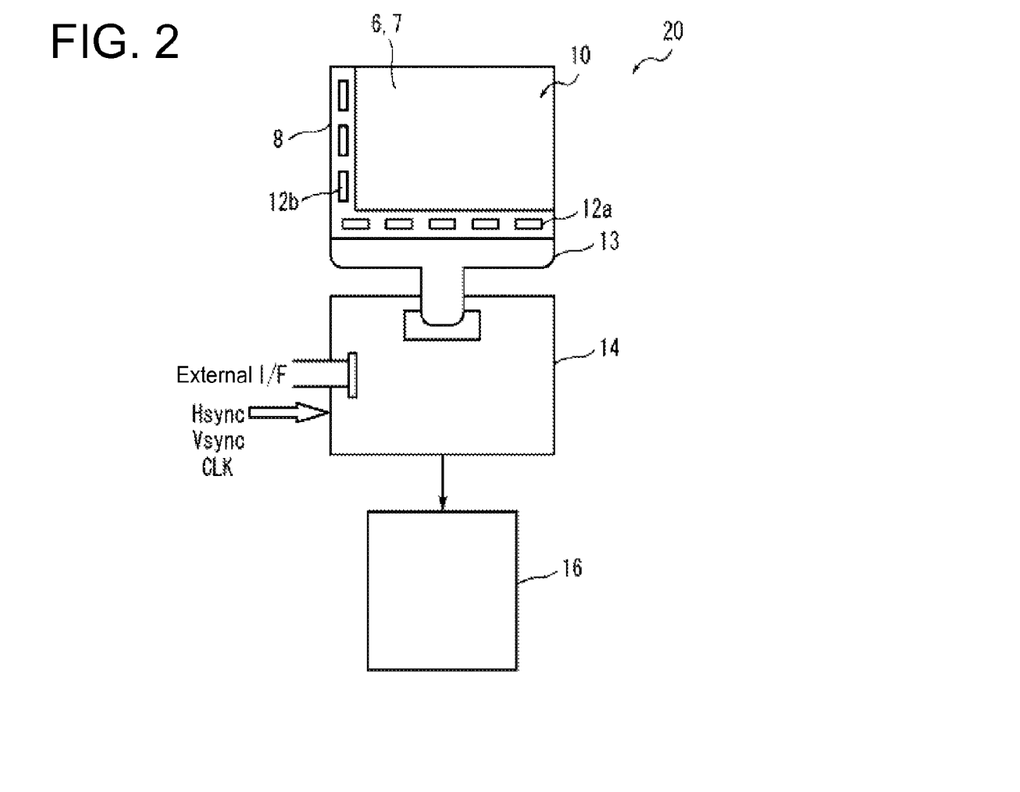

FIGS. 1 and 2 are schematic drawings that show a configuration of a touch sensor-equipped display device 20 according to Embodiment 1 of the present invention.

As shown in FIGS. 1 and 2, the touch sensor-equipped display device 20 is provided with an active matrix (TFT, for example) display panel 10, a touch sensor part 7, a driver circuit 14 that supplies various types of signals to the display panel 10, and a touch sensor circuit 16.

The driver circuit 14 is connected to source drivers 12a and gate drivers 12b via an FPC (flexible printed circuit) 13. The source drivers 12a and the gate drivers 12b may be mounted as chips on an active matrix substrate 8 of the display panel 10 or formed monolithically in the active matrix substrate 8.

An image signal, a horizontal synchronization signal $H_{SYNC}$, a vertical synchronization signal $V_{SYNC}$, a clock signal CLK (pixel clock), and the like are inputted to the driver circuit 14 via an external interface (UF). If the image signal is in analog, the clock signal CLK may be generated by a PLL circuit inside the driver circuit 14, for example. The vertical synchronization signal $V_{SYNC}$, the horizontal synchronization signal $H_{SYNC}$, and, if necessary, the clock signal CLK are supplied to the touch sensor circuit 16 either via the driver circuit 14 or directly from the outside.

The display panel 10 has at least the active matrix substrate 8, the opposite substrate 6, and a display medium layer 4 interposed between the substrates.

The active matrix substrate 8 has a TFT array layer 3 that includes switching elements such as TFTs, wiring lines, and the like on a glass substrate 2. The active matrix substrate 8 also has a plurality of pixel electrodes arranged in a matrix form. The display medium layer 4 is a liquid crystal layer, for example. The opposite substrate 6 has a color filter (not shown in drawings) and an opposite electrode 5 formed on the entire surface of the substrate. If the display panel 10 uses liquid crystals as the display medium layer 4, for example, and controls the display using polarization, then a polarizing plate is provided on at least one of the surfaces of the display panel 10. In an example of a configuration in FIG. 1, a first polarizing plate 1 (polarizing element) is provided on the rear side (opposite to the viewer side) of the active matrix substrate 8. Depending on the type of polarization, a second polarizing plate (not shown in drawings) may be provided on the side of the opposite substrate 6 as an analyzer.

In the above description, a color filter and a second polarizing plate are provided in the display panel 10, but a configuration may be used in which the color filter and the second polarizing plate are disposed on the viewer side of the touch sensor part 7. Besides these, various types of optical members such as a retardation plate or a lens sheet are provided as necessary in the display panel 10.

The touch sensor part 7 is disposed on the front surface (viewer side) of the display panel 10. The touch sensor part 7 has a touch sensor substrate formed of glass or transparent plastic, for example, and transparent conductive films provided on the surface of the touch sensor substrate. The transparent conductive films, which will be described in detail later, are formed into a prescribed pattern using a known thin film forming technique such as the sputtering method. The material for the transparent conductive film is indium tin oxide (ITO), indium zinc oxide (IZO), a tin oxide (NESA), a zinc oxide, or the like, for example. In order to have a transparent conductive film with excellent heat resistance and durability, it is preferable for the film to be formed through the sputtering method using a target containing Mg. However, the material and the film-forming method of the transparent conductive film are not particularly limited to the examples shown here, and various materials and film-forming methods can be used.

The touch sensor part 7 may be bonded with no gap to the surface of the display panel 10 using an adhesive or the like, or installed with a gap (air layer) being provided. The touch sensor part 7 may be disposed such that the transparent conductive films thereof face the display panel 10, or conversely, such that the touch sensor substrate thereof faces the display panel 10.

The touch sensor substrate may be omitted from the touch sensor part 7. In this case, the touch sensor part 7 can be attained by directly forming the transparent conductive films on the outer surface of the display panel 10 on the viewer side. This configuration has the advantage that the entire touch sensor-equipped display device can be made thin.

It is preferable to form a protective layer on the topmost surface on the viewer side whether or not a touch sensor substrate is provided in the touch sensor part 7. An inorganic thin film such as $SiO_2$ or $SiNO_X$, a transparent resin coating film, a transparent resin film such as PET or TAC, or the like can be used for the protective layer, for example. In addition, anti-reflective treatment and/or anti-contamination treatment may be conducted as necessary to the touch sensor part 7.

In the present embodiment, an active matrix (TFT, for example) liquid crystal display panel is used for the display panel 10. In the display panel 10, the polarity of the common voltage supplied to the opposite electrode 5 of the opposite substrate 6 reverses every certain period (one horizontal synchronization period, for example). This is to prevent direct current voltage from being applied to the liquid crystal layer, which is the display medium layer 4, and to decrease the breakdown voltage required of the gate drivers and the source drivers.

Figure 3:
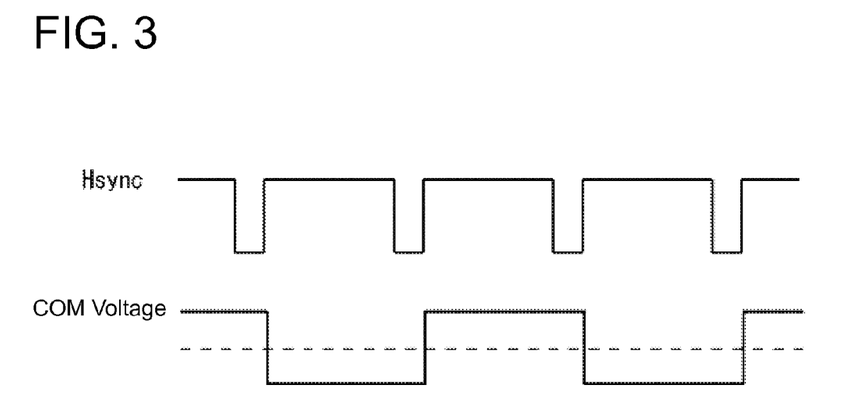
FIG. 3 is a drawing that shows one example of a variation over time of a common voltage (COM voltage) that is applied to an opposite electrode of the display panel.

FIG. 3 is a drawing that shows one example of a variation over time of a common voltage (COM voltage) applied to the opposite electrode 5 of the display panel 10. The example in FIG. 3 is a so-called line inversion driving in which the polarity (positive and negative) of the common voltage reverses every one horizontal synchronization period. However, the present invention is not limited to this, and can be applied to a so-called two-line inversion driving or the like in which the polarity of the common voltage reverses every two horizontal synchronization periods. In FIG. 3, a common voltage waveform is shown as an example in which the absolute value of the positive polarity voltage and the absolute value of the negative polarity voltage of the common voltage are equal. However, in the case of a TFT liquid crystal panel, for example, the absolute value of the positive polarity voltage of the common voltage is not necessarily equal to the absolute value of the negative polarity voltage.

When the polarity of the common voltage supplied to the opposite electrode 5 switches from positive to negative or from negative to positive in this manner, an induced voltage occurs in the touch sensor part 7, which becomes a noise component in the touch sensor output.

Figure 4A:
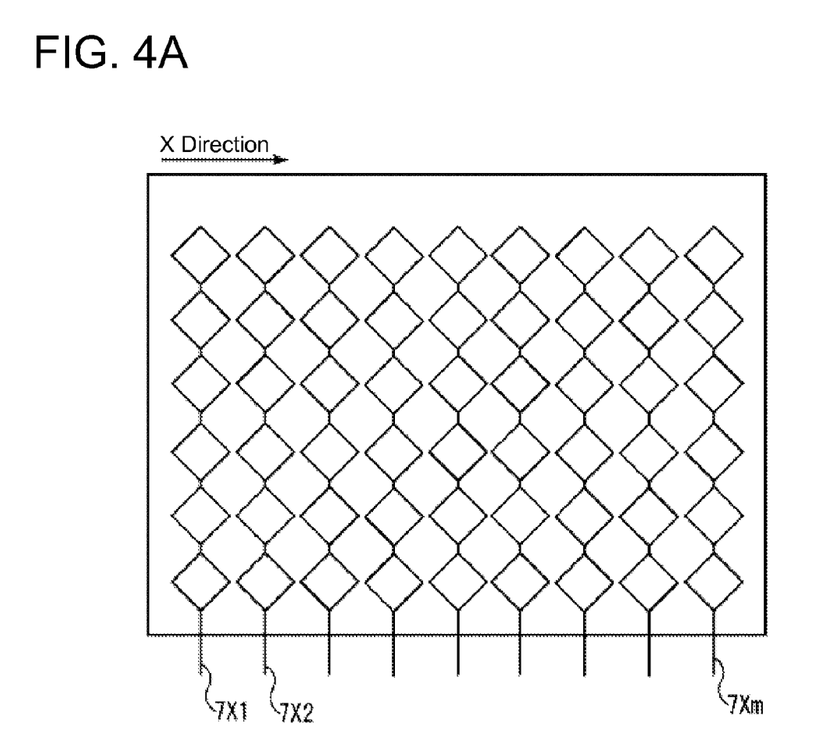
FIG. 4A is a schematic drawing that shows only the transparent conductive films for detecting the touch position in the X direction among the transparent conductive films of the touch sensor part, and shows an example of a configuration thereof.
Figure 4B:
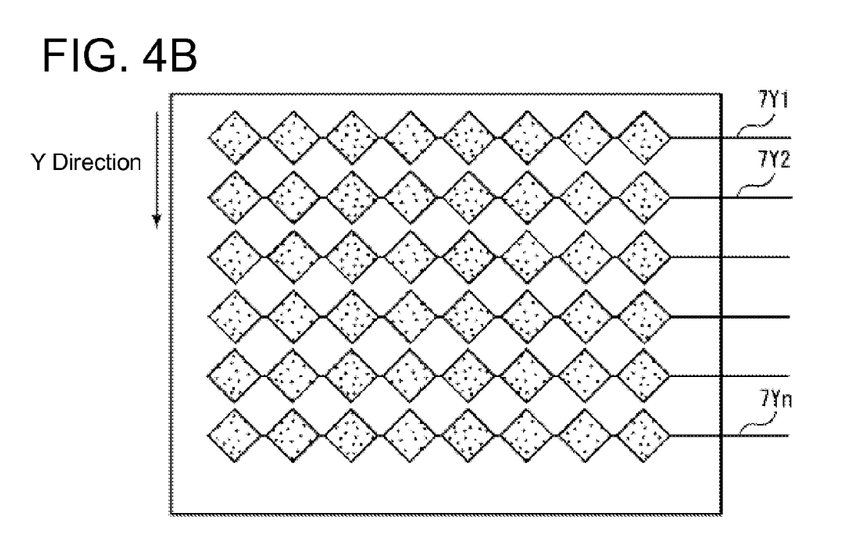
FIG. 4B is a schematic drawing that shows only the transparent conductive films for detecting the touch position in the Y direction among the transparent conductive films of the touch sensor part, and shows an example of a configuration thereof.
Figure 4C:
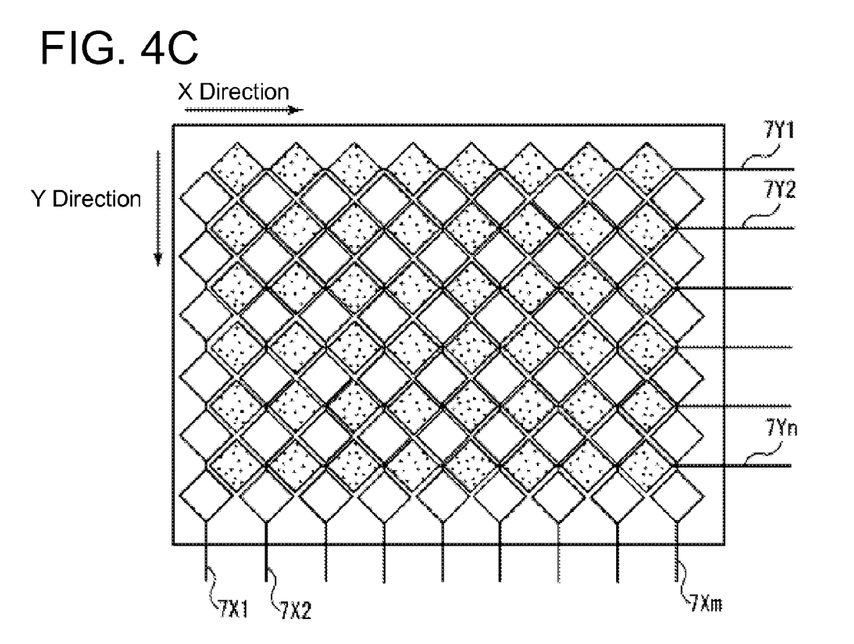
FIG. 4C is a schematic drawing that shows the configuration of all of the transparent conductive films of the touch sensor part.

Next, the configuration of the touch sensor part 7 according to the present embodiment, along with the drive operation thereof will be described in further detail. In the description below, the long side direction of the touch sensor part 7 is designated as the X direction and the direction intersecting at a right angle therewith is designated as the Y direction. FIG. 4A is a schematic drawing that shows only the transparent conductive films for detecting the touch position in the X direction among the transparent conductive films of the touch sensor part 7, and shows an example of a configuration thereof. FIG. 4B is a schematic drawing that shows only the transparent conductive films for detecting the touch position in the Y direction among the transparent conductive films of the touch sensor part 7, and shows an example of a configuration thereof. FIG. 4C is a schematic drawing that shows the configuration of all of the transparent conductive films of the touch sensor part 7. In FIGS. 4B and 4C, the transparent conductive films for detecting a touch position in the Y direction are shown with a dotted pattern for ease of distinction from the X direction transparent conductive films. In other words, the actual transparent conductive films do not have this type of pattern.

As shown in FIGS. 4A and 4B, the touch sensor part 7 has an "m" number of electrode patterns 7X1, 7X2, . . . 7Xm in the X direction (first sensor electrode group), and an "n" number of electrode patterns 7Y1, 7Y2, . . . 7Yn in the Y direction (second sensor electrode group). In FIG. 4A and the like, the drawings are simplified for ease of description, but the actual number of electrode patterns (m, n) provided in the touch sensor part 7 is determined based on the sensor resolution needed for the touch sensor part 7. The touch sensor part 7 of the present embodiment determines the X coordinate of the touch position based on the electrode patterns 7X1, 7X2, . . . 7Xm, and determines the Y coordinate of the touch position based on the electrode patterns 7Y1, 7Y2, . . . 7Yn. Therefore, it is preferable for the electrode patterns to be disposed with a density such that when a finger, a stylus, or the like comes into contact, the contacting body simultaneously comes into contact with at least one electrode pattern in the X direction out of 7X1, 7X2, . . . 7Xm and at least one electrode pattern in the Y direction out of 7Y1, 7Y2, . . . 7Yn.

As shown in FIGS. 4A and 4B, the electrode patterns 7X1 to 7Xm and the electrode patterns 7Y1 to 7Yn each have a pattern in which a plurality of conductive films patterned so as to form a rectangular shape are connected in series via a conductive wiring line such that the corners of the rectangles face each other. The conductive wiring lines may be formed of the same material as the conductive films or may be formed of another conductive material. The conductive wiring lines are drawn out to the outside of the touch sensor part 7 as shown in FIG. 4C, and are connected to a sensor output read circuit, which will be described later.

In the example shown in FIG. 4C, the rectangular parts of the X direction electrode patterns 7X1, 7X2, . . . 7Xm, and the rectangular parts of the Y direction electrode patterns 7Y1, 7Y2, . . . 7Yn are arranged so as not to overlap with each other. At the intersection points between the conductive wiring lines of the electrode patterns 7X1, 7X2, . . . 7Xm and the conductive wiring lines of the electrode patterns 7Y1, 7Y2, . . . 7Yn, insulating films are interposed between the wiring lines such that the conductive wiring lines in the X direction are not connected electrically to the conductive wiring lines in the Y direction.

However, the configuration of the conductive films of the touch sensor part 7 is not limited to the example shown in FIG. 4C. The X direction electrode patterns and the Y direction electrode patterns may be configured so as to overlap with each other, for example. In this case, the X direction electrode patterns and the Y direction electrode patterns may be formed in different layers sandwiching an insulating film layer. Alternatively, insulating films may be interposed between the X direction electrode patterns and the Y direction electrode patterns at least in locations where these patterns overlap.

Figure 5:
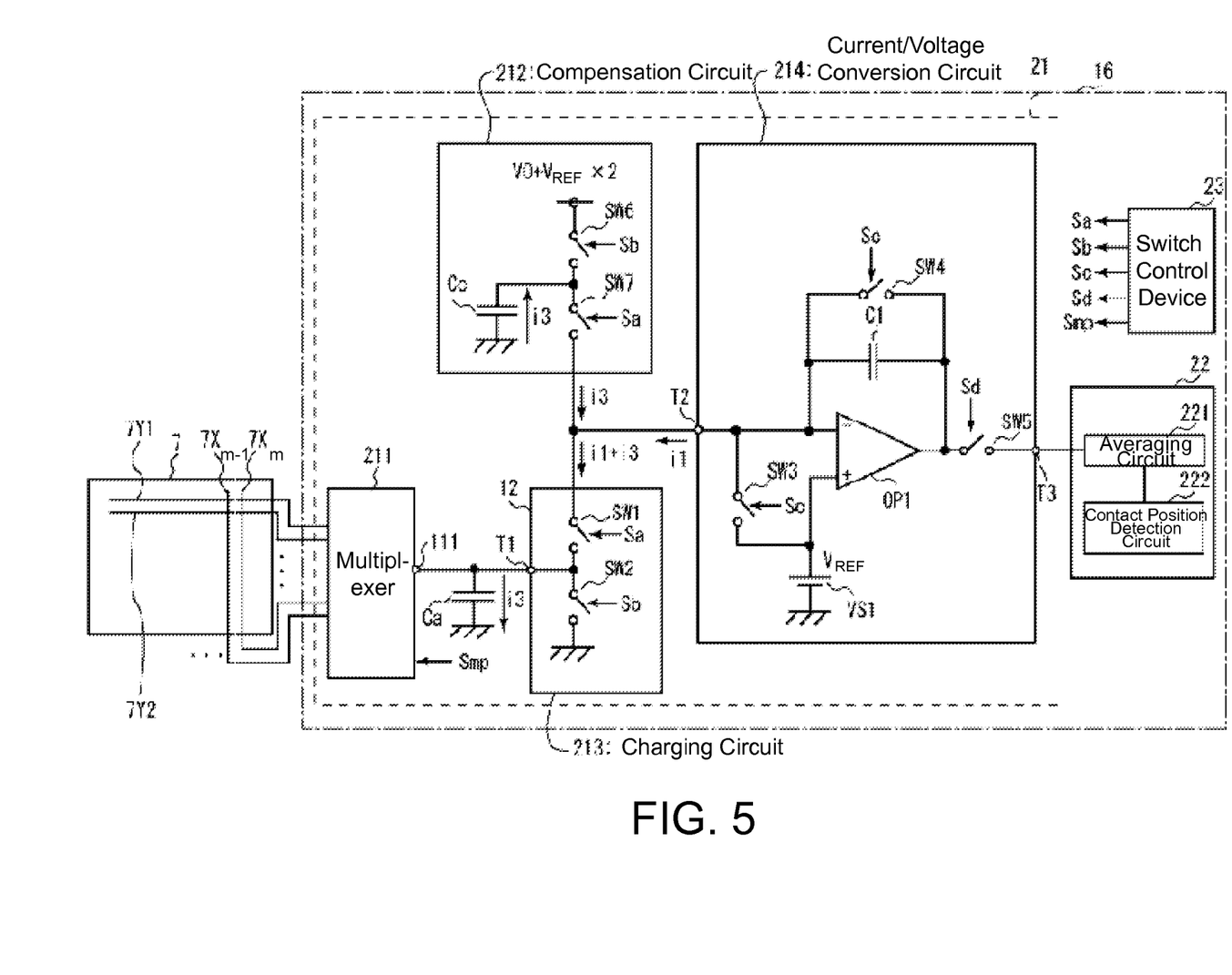
FIG. 5 is a circuit diagram that shows the internal configuration of a touch sensor circuit.

Next, the configuration of the touch sensor circuit 16 will be described. FIG. 5 is a circuit diagram that shows the internal configuration of the touch sensor circuit 16. As shown in FIG. 5, the touch sensor circuit 16 is provided with a sensor output read circuit 21, a coordinate calculation device 22, and a switch control device 23 (sensor control circuit).

The sensor output read circuit 21 outputs signals representing the capacitance of the electrode patterns 7X1, 7X2, . . . 7Xm and the electrode patterns 7Y1, 7Y2, . . . 7Yn of the touch sensor part 7. The coordinate calculation device 22 finds the coordinates of a position where a contacting body has come into contact with the electrode patterns 7X1, 7X2, . . . 7Xm and the electrode patterns 7Y1, 7Y2, . . . 7Yn based on the output signal values from the sensor output read circuit 21. The switch control device 23 controls the operation of the sensor output read circuit 21 by supplying control signals to the various types of switches and the like of the sensor output read circuit 21.

The sensor output read circuit 21 is provided with a multiplexer 211, a compensation circuit 212, a charging circuit 213, and a current/voltage conversion circuit 214.

The multiplexer 211 selectively and sequentially connects the output from the electrode patterns 7X1, 7X2, . . . 7Xm and the electrode patterns 7Y1, 7Y2, . . . 7Yn of the touch sensor part 7 to the charging circuit 213, one at a time. In other words, the multiplexer 211 divides one sensor cycle into m+n periods, and selects one electrode pattern per period. The selection of the electrode pattern by the multiplexer 211 is controlled by a selection signal Smp supplied from the switch control device 23.

The charging circuit 213 is provided with switching elements SW1 and SW2. The switching element SW1 switches between connecting and disconnecting a terminal T1 of the charging circuit 213 to the current/voltage conversion circuit 214. The switching element SW2 switches between connecting and disconnecting the terminal T1 to a ground voltage. The switching done by the switching elements SW1 and SW2 is controlled by control signals Sa and Sb supplied from the switch control device 23.

The compensation circuit 212 is provided with a capacitor Cc and switching elements SW6 and SW7. The switching element SW6 switches between connecting and disconnecting one terminal of the capacitor Cc to a power source terminal to which a voltage $(V_0+V_{REF}\times 2)$ is applied. The switching element SW7 switches between connecting and disconnecting one terminal of the capacitor Cc to the switching element SW1 of the charging circuit 213. The other terminal of the capacitor Cc is maintained at ground potential. The capacitance of the capacitor Cc is set to be at the same capacitance as a parasitic capacitance Ca formed between the electrode patterns of the touch sensor part 7 and the terminal T1 of the charging circuit 213. In order to compensate for a current i3 flowing into the parasitic capacitance Ca, the compensation circuit 212 supplies an equal size current i3 to the touch sensor part 7 side via the switching element SW1.

The current/voltage conversion circuit 214 is provided with a capacitor C1, a differential amplifier OP1, and switching elements SW3, SW4, and SW5. The capacitor C1 functions as a charge storage part for storing charge. One terminal of the capacitor C1 is connected to one of two input terminals of the differential amplifier OP1. The other input terminal of the differential amplifier OP1 is connected to a power source terminal VS1 to which a voltage $V_{REF}$ is applied. The other terminal of the capacitor C1 is connected to an output terminal of the differential amplifier OP1.

The switching element SW3 switches between connecting and disconnecting the terminal of the capacitor C1, which is connected to an input terminal of the differential amplifier OP1, to the power source terminal VS1 to which a voltage $V_{REF}$ is applied. The switching element SW4 switches between connecting and disconnecting the two terminals of the capacitor C1. The switching done by the switching elements SW3 and SW4 is controlled by a control signal Sc supplied from the switch control device 23.

The switching element SW5 switches between connecting and disconnecting the output terminal of the differential amplifier OP1 to the coordinate calculation device 22. The switching done by the switching element SW5 is controlled by a control signal Sd supplied from the switch control device 23.

The coordinate calculation device 22 is provided with an averaging circuit 221 and a contact position detection circuit 222 (coordinate position detection circuit). The averaging circuit 221, which will be described in detail later, finds the average values between the output signal values obtained through a plurality of scans done by the sensor output read circuit 21. The contact position detection circuit 222 calculates the coordinates of a position where a stylus, a finger, or the like has come into contact based on the average values found by the averaging circuit 221.

The coordinate position detection operation by the touch sensor circuit 16 will be described below.

First, the switch control device 23 sets the switching elements SW2, SW3, SW4, and SW6 to the ON state, and sets the switching elements SW1, SW5, and SW7 to the OFF state. In this state, the voltage of the terminal 111 is set to $V_0$ (ground voltage), and the difference in potential between the two terminals of the capacitor Cc is set to $V_0+2V_{REF}$. Also, both terminals of the capacitor C1 are set to the same voltage $V_{REF}$. At this time, the difference in potential between the two terminals of the capacitor C1 is 0V.

Next, the switch control device 23 sets the switching elements SW1, SW5, and SW7 to the ON state, and sets the switching elements SW2, SW3, SW4, and SW6 to the OFF state. In this state, the capacitor C1 and an electrode pattern selected by the multiplexer 211 out of the electrode patterns of the touch sensor part 7 are connected. If, at this time, a contacting body such as a finger or a stylus comes into contact with the electrode pattern, a current flows to the contacting body, and the amount of charge stored in the capacitor C1 changes. At this time, the current i3 flowing into the parasitic capacitance Ca is compensated with the equal size current i3 flowing from the capacitor Cc. The differential amplifier OP1 outputs a voltage signal corresponding to the amount of charge stored in the capacitor C1. As a result, signals of different voltages are outputted from a terminal T3 of the current/voltage conversion circuit 214 depending on whether or not a contacting body is in contact with the electrode patterns of the touch sensor part 7 and the difference in permittivity or the like of the contacting body.

Therefore, the coordinate calculation device 22 can detect whether or not a contacting body is in contact with the electrode pattern of the touch sensor part 7 based on the output signal from the terminal T3 of the current/voltage conversion circuit 214. Whether or not a contacting body is in contact can be detected by calculating the value of the output signal from the terminal T3 of the current/voltage conversion circuit 214 when nothing is in contact with the electrode patterns of the touch sensor part 7 and storing the value to begin with, and comparing this value with an output signal value, for example.

The coordinate calculation device 22 is provided with a memory (not shown in drawings) that stores the value of the output signal from the terminal T3 of the current/voltage conversion circuit 214. As described above, during one sensor cycle (one scan), the multiplexer 211 sequentially selects X direction electrode patterns 7X1, 7X2, . . . 7Xm, and Y direction electrode patterns 7Y1, 7Y2, . . . 7Yn: a total of m+n electrode patterns. As a result, during one sensor cycle, an m+n number of signal values are obtained as the output signals from the terminal T3 of the current/voltage conversion circuit 214. The coordinate calculation device 22 detects the contact position of a contacting body based on these m+n signal values. If it is determined that a contacting body is in contact with the electrode pattern 7X1 of the X direction electrode patterns 7X1, 7X2, . . . 7Xm and that the contacting body is also in contact with the Y direction electrode pattern 7Y1, for example, then it can be determined that a finger, a stylus, or the like is in contact with the vicinity of the intersection point between the X direction electrode pattern 7X1 and the Y direction electrode pattern 7Y1. The number of contact points detected during one sensor cycle is not limited to one.

Figure 6:
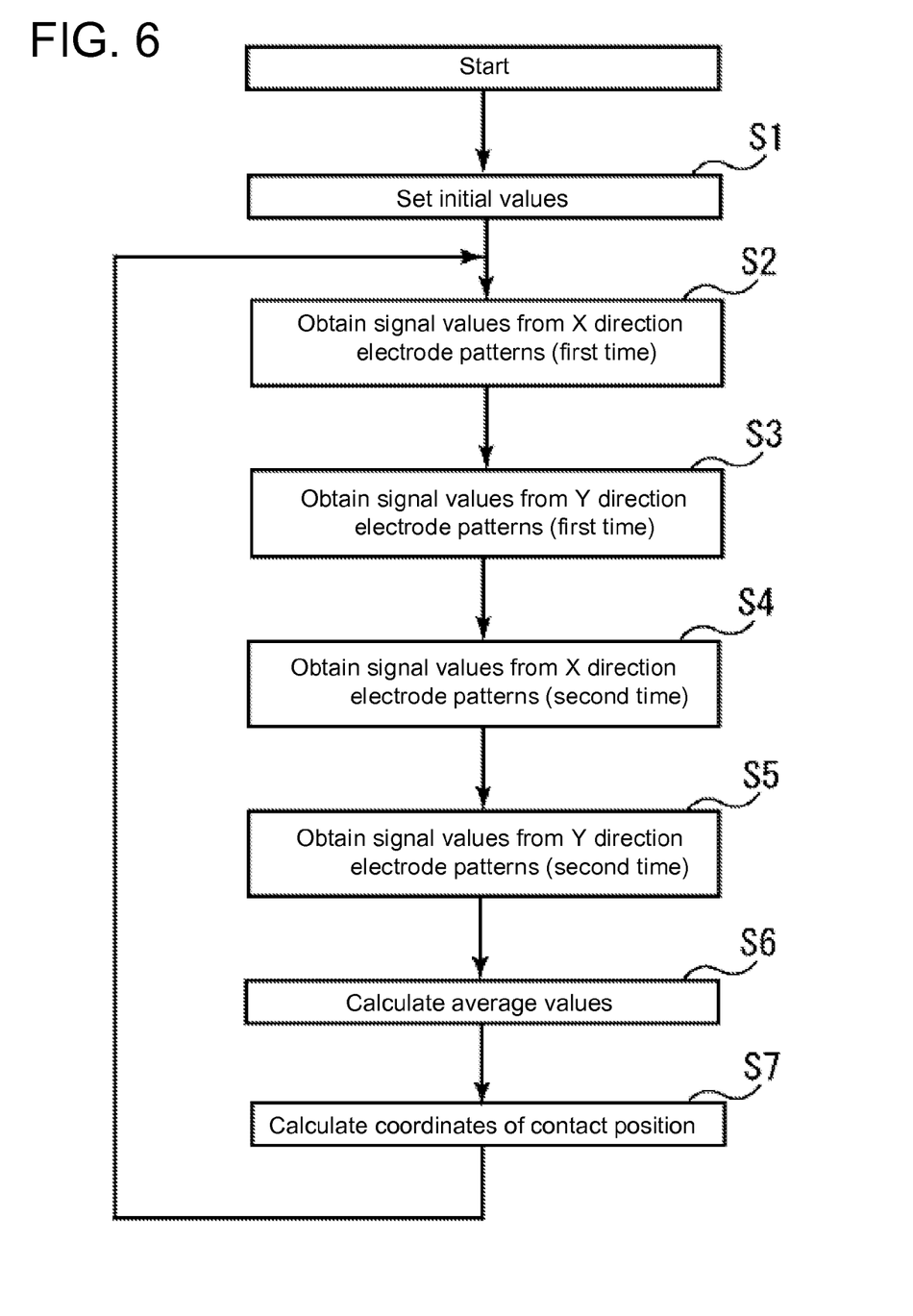
FIG. 6 is a flow chart that shows one example of an operation by the touch sensor circuit.

Next, the drive operation of the display panel 10 and the drive operation of the touch sensor part 7 in the touch sensor-equipped display device 20 according to the present embodiment will be described. FIG. 6 is a flow chart that shows one example of an operation by the touch sensor circuit 16.

As shown in FIG. 6, when the power source is turned ON, the operation of the touch sensor circuit 16 is started. First, various initial values are set (step S1).

Figure 7:
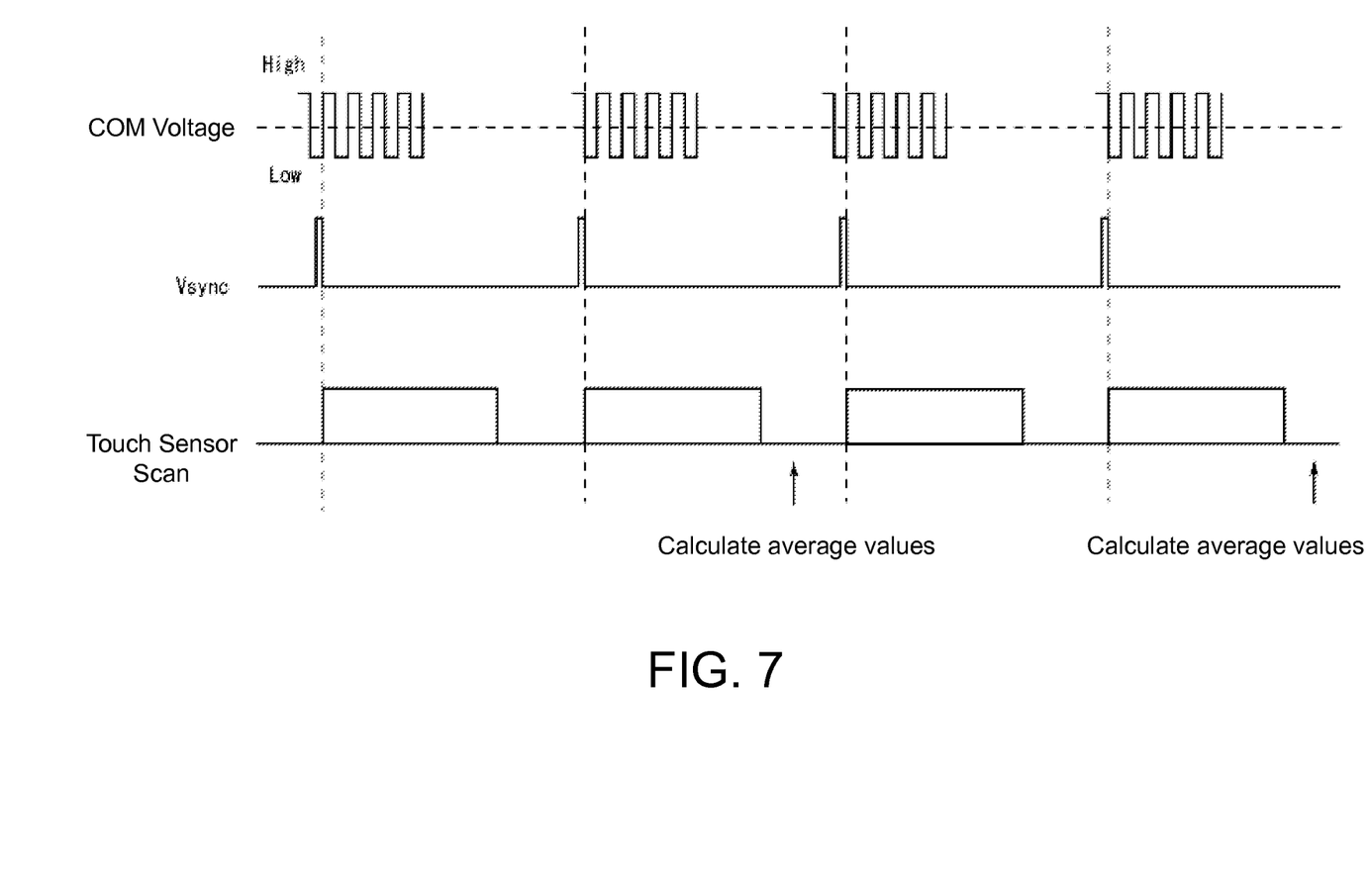
FIG. 7 is a timing chart that shows a timing of scan operations and average value calculation operations in the touch sensor circuit according to Embodiment 1.

Next, in the sensor output read circuit 21, the multiplexer 211 sequentially selects X direction electrode patterns 7X1, 7X2, . . . 7Xm according to the control signal Smp from the switch control device 23. As a result, the electrode patterns are sequentially connected to the charging circuit 213, which allows an "m" number of output signal values based on the capacitance of the respective electrode patterns to be obtained (step S2). The "m" number of output signal values obtained in step S2 are stored as X direction data obtained during a first scan in an internal or external memory (not shown in drawings) of the coordinate calculation device 22. The switch control device 23 starts the selection of electrode patterns by the multiplexer 211 in synchronization with the fall (a switch from high level to low level) of a pulse of the vertical synchronization signal $V_{SYNC}$, as shown in FIG. 7.

Next, the multiplexer 211 sequentially selects the Y direction electrode patterns 7Y1, 7Y2, . . . 7Yn according to the control signal Smp from the switch control device 23. As a result, the electrode patterns are sequentially connected to the charging circuit 213, which allows an "n" number of output signal values based on the capacitance of the respective electrode patterns to be obtained (step S3). The "n" number of output signal values obtained in step S3 are stored as Y direction data obtained during the first scan in the internal or external memory (not shown in drawings) of the coordinate calculation device 22.

Next, the multiplexer 211 sequentially selects the X direction electrode patterns 7X1, 7X2, . . . 7Xm again according to the control signal Smp from the switch control device 23. As a result, an "m" number of output signal values based on the capacitance of the electrode patterns are obtained (step S4). The "m" number of output signal values obtained in step S4 are stored as X direction data obtained during a second scan in the internal or external memory (not shown in drawings) of the coordinate calculation device 22. In the second scan, too, the switch control device 23 starts the selection of the electrode patterns by the multiplexer 211 in synchronization with the fall of a pulse of the vertical synchronization signal $V_{SYNC}$, as shown in FIG. 7.

Next, the multiplexer 211 sequentially selects the Y direction electrode patterns 7Y1, 7Y2, . . . 7Yn according to the control signal Smp from the switch control device 23. As a result, an "n" number of output signal values based on the capacitance of the electrode patterns are obtained (step S5). The "n" number of output signal values obtained in step S5 are stored as Y direction data obtained during the second scan in the internal or external memory (not shown in drawings) of the coordinate calculation device 22.

As a result of the process of steps S2 to S5, an m+n number of output signal values obtained during the first scan and an m+n number of output signal values obtained during the second scan are stored in the memory.

Next, in the coordinate calculation device 22, the averaging circuit 221 reads out data stored in the memory, and finds respective averages of the m+n output signal values obtained during the first scan and the m+n output signal values obtained during the second scan (step S6). In other words, the coordinate calculation device 22 finds the average values between the values obtained during the first scan and the values obtained during the second scan, in terms of the output signal values obtained respectively for each of the electrode patterns 7X1, 7X2, . . . 7Xm and the electrode patterns 7Y1, 7Y2, . . . 7Yn.

Next, in the coordinate calculation device 22, the contact position detection circuit 222 finds the coordinates of the position where a contacting body has come into contact by comparing the average values found in step S6 to a prescribed threshold (step S7). Here, the prescribed threshold is a value obtained by adding a margin, as necessary, to the output signal value of the sensor output read circuit 21 obtained when nothing is in contact with the electrode patterns, for example.

The process of respectively storing the output signal values obtained during an odd numbered scan and the output signal values obtained during an even numbered scan in the memory in steps S2 to S5, deriving the average values thereof in step S6, and finding the coordinates of the contact position in step S7 is repeated.

Through the above process, the touch sensor circuit 16 obtains an m+n number of output signal values based on the respective capacitances of the electrode patterns 7X1, 7X2, . . . 7Xm, 7Y1, 7Y2, . . . 7Yn twice over two periods of the vertical synchronization signal $V_{SYNC}$, as shown in FIG. 7. Over a two period unit of the vertical synchronization signal $V_{SYNC}$, the common voltage (COM voltage) supplied to the opposite electrode 5 switches from negative polarity to positive polarity when a pulse of the vertical synchronization signal $V_{SYNC}$ falls during one of the periods (the first period in the example shown in FIG. 7). During the other period (the second period in the example shown in FIG. 7), the COM voltage switches from positive polarity to negative polarity when a pulse of the vertical synchronization signal $V_{SYNC}$ falls.

Therefore, in the present embodiment, the first scan starts when the COM voltage is at positive polarity and the second scan starts when the COM voltage is at negative polarity. Therefore, the noise received by the output signal value obtained during the first scan due to the polarity reversal of the COM voltage and the noise received by the output signal value obtained during the second scan due to the polarity reversal of the COM voltage are at opposite polarity to each other. Therefore, by finding the average values of the output signal values obtained during the first scan and the output signal values obtained during the second scan in the averaging circuit 221, the noise originating in the polarity reversal of the COM voltage can be cancelled out.

Embodiment 2

A touch sensor-equipped display device according to Embodiment 2 of the present invention will be described below with reference to the drawings. In terms of configurations that have the same functions as Embodiment 1, the same reference characters will be used, and detailed descriptions thereof will be omitted.

The configuration of a touch sensor-equipped display device according to Embodiment 2 is similar to the touch sensor-equipped display device 20 of Embodiment 1. However, in the touch sensor-equipped display device according to Embodiment 2, the operation of a touch sensor circuit 16 differs from that of Embodiment 1.

Figure 8:
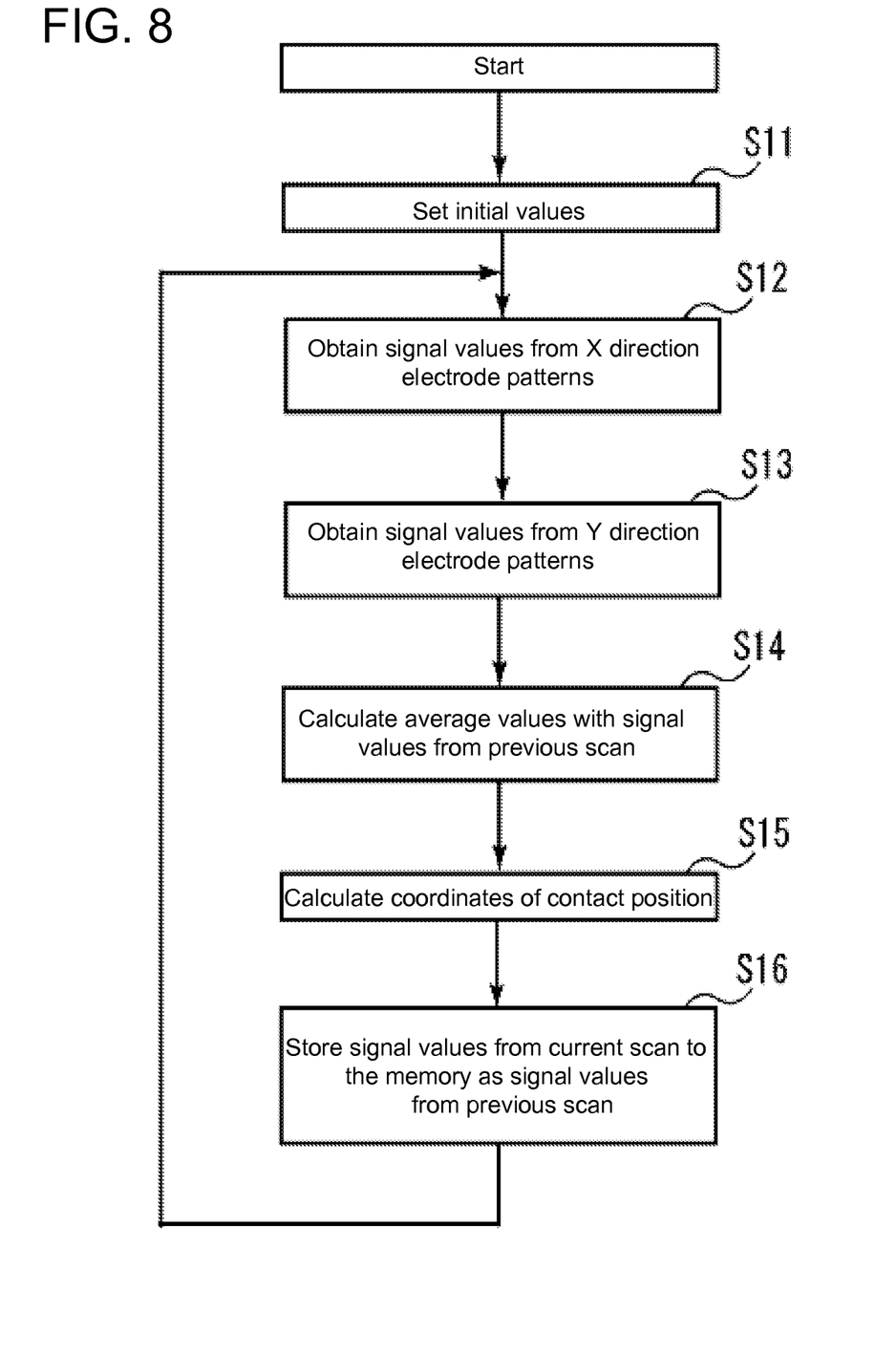
FIG. 8 is a flow chart that shows a modified example of an operation by a touch sensor circuit according to Embodiment 2.

FIG. 8 is a flow chart that shows a modified example of an operation of the touch sensor circuit 16 according to the present embodiment. As shown in FIG. 8, the operation of the touch sensor circuit 16 starts when the power source is turned ON. First, various initial values are set (step S11). At this time, the "output signal value obtained during the previous scan" from the respective electrode patterns are set to zero as initial values, for example, in a memory that stores the output signal values from the sensor output read circuit 21.

Next, the multiplexer 211 sequentially selects the X direction electrode patterns 7X1, 7X2, . . . 7Xm according to a control signal Smp from the switch control device 23. As a result, an "m" number of output signal values corresponding to the capacitances of the electrode patterns are obtained (step S12). The "m" number of output signal values obtained in step S12 are stored in an internal or external memory (not shown in drawings) of the coordinate calculation device 22 as X direction data obtained in the current scan. This memory is provided with separate regions for storing data obtained in the previous scan and data obtained in the current scan. In the present embodiment, too, the switch control device 23 starts the selection of electrode patterns by the multiplexer 211 in synchronization with the fall of a pulse of a vertical synchronization signal $V_{SYNC}$, as shown in FIG. 7.

Next, the multiplexer 211 sequentially selects the Y direction electrode patterns 7Y1, 7Y2, . . . 7Yn according to the control signal Smp from the switch control device 23. As a result, an "n" number of output signal values corresponding to the capacitances of the electrode patterns are obtained (step S13). The "n" number of output signal values obtained in step S13 are stored in the internal or external memory (not shown in drawings) of the coordinate calculation device 22 as Y direction data obtained during the current scan.

Next, the averaging circuit 221 of the coordinate calculation device 22 refers to the memory, and finds average values between the output signal values obtained during the previous scan and output signal values obtained during the current scan (step S14).

The contact position detection circuit 222 of the coordinate calculation device 22 then compares the average values found in step S14 to a prescribed threshold, thus determining the coordinates of the position where a contacting body has come into contact (step S15). Here, the prescribed threshold is a value obtained by adding a margin, as necessary, to the output signal value of the sensor output read circuit 21 obtained when nothing is in contact with the electrode patterns, for example.

Next, the coordinate calculation device 22 stores the output signal values obtained in step S12 and step S13 as "output signal values obtained in the previous scan" in the memory (step S16).

Thereafter, the process of steps S12 to S16 is repeated. When step S14 is first done, because the "output signal values obtained in the previous scan" for the respective electrode patterns were set to zero in the memory through the initial value setting process in step S11, the output values from the averaging circuit 221 are the output signal values obtained in the current scan. When step S14 is done a second or following time, the output signal values actually obtained in the previous scan are stored in the memory. Therefore, by finding the average values thereof, noise originating from the polarity reversal of the COM voltage can be cancelled out as described in Embodiment 1.

Figure 9:
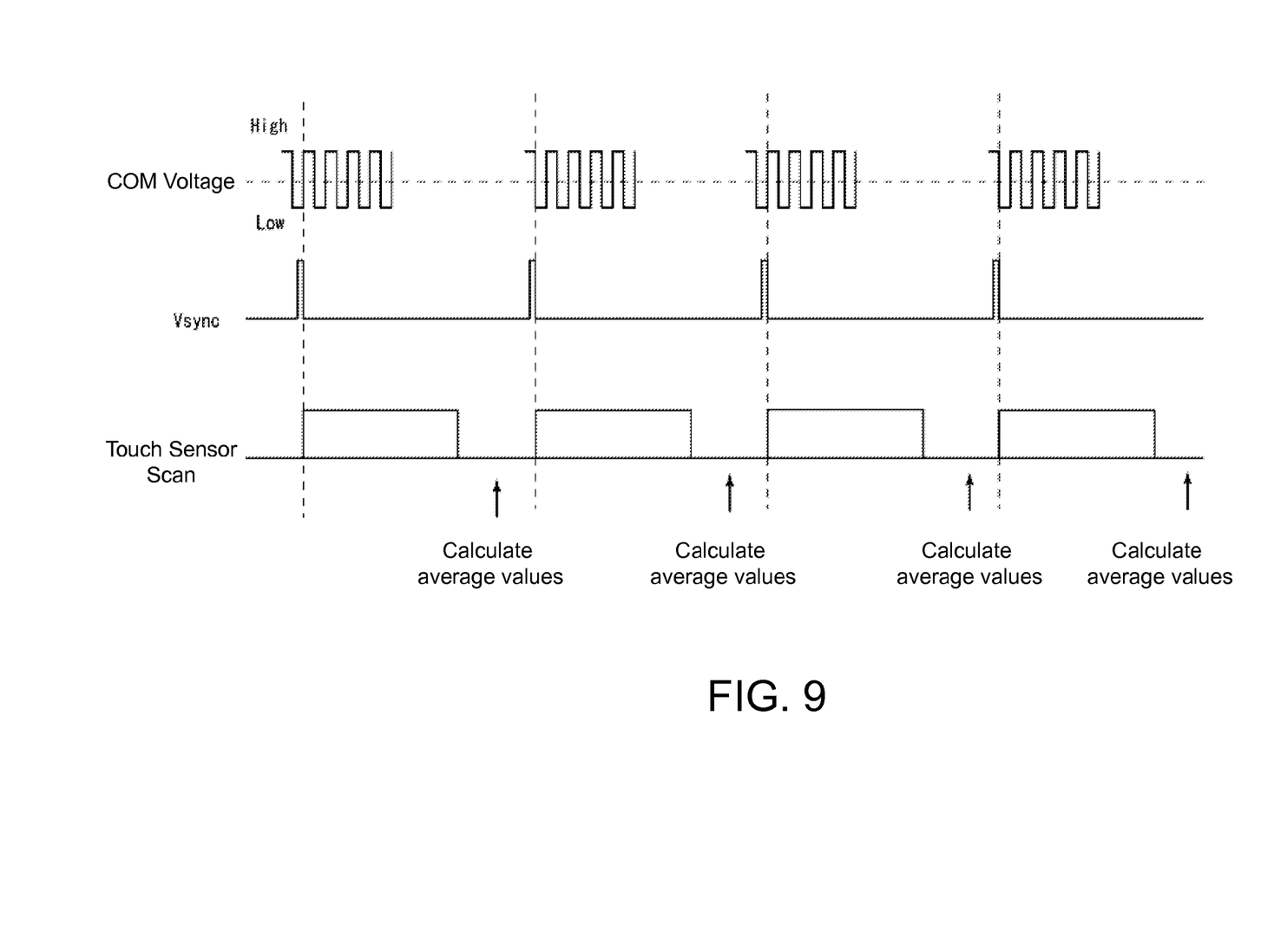
FIG. 9 is a timing chart that shows a timing of scan operations and average value calculation operations in the touch sensor circuit according to Embodiment 2.

As shown in FIG. 9, in the configuration according to Embodiment 2, every time one scan is done in the touch sensor part 7, the average values between the output signal values of the previous scan and those of the current scan are taken, and the coordinates of the contact position are found based on the average values. Therefore, compared to the configuration according to Embodiment 1 shown in FIG. 7, the frequency of the coordinate detection of the contact position in the touch sensor part 7 is twice as much.

Embodiments of the present invention have been described above, but the embodiments are mere examples of implementations the present invention. The present invention is not limited to the above embodiments, and can be implemented by appropriately modifying the above embodiments without departing from the spirit thereof.

In the above description, for example, configurations in which the contact position is detected by utilizing changes in the capacitance of the electrode patterns when a finger, a stylus, or the like has come into contact have been shown as examples. However, the configuration of the touch sensor part is not limited to the capacitance coupling type, and other appropriate types may be used. Also, the present invention is not limited to a touch-type sensor, and the present invention can also be applied to a sensor that electrically or optically detects an approach of a finger, a stylus, or the like.

Also, in the description above, the configuration in which the electrode patterns 7X1, 7X2, . . . 7Xm and the electrode patterns 7Y1, 7Y2, . . . 7Yn are sequentially selected using one multiplexer over one sensor cycle has been shown as an example. In other words, in the above description, the configuration in which the touch sensor circuit 16 is provided with one sensor output read circuit 21 has been shown as an example. However, a configuration in which the electrode patterns 7X1, 7X2, . . . 7Xm and the electrode patterns 7Y1, 7Y2, . . . 7Yn are respectively provided with one sensor output read circuit 21 each may be used. According to this configuration, the electrode patterns 7X1, 7X2, . . . 7Xm and the electrode patterns 7Y1, 7Y2, . . . 7Yn can be scanned simultaneously.

In the above-mentioned embodiments, the case where the average was taken for the output signal values obtained as a result of two scan operations has been described as an example, but the number of scan operations to be averaged is not limited to two. The average may be taken for output signal values obtained from four scan operations, for example.

INDUSTRIAL APPLICABILITY

The present invention has industrial applicability as a touch sensor-equipped display device.

The invention claimed is:

1. A touch sensor-equipped display device, comprising:
a display panel that has an active matrix substrate having a plurality of pixel electrodes, a display medium layer, and an opposite substrate having an opposite electrode that faces the plurality of pixel electrodes;
a display panel driver circuit that supplies a display signal voltage to the plurality of pixel electrodes, the display panel driver circuit also supplying a common voltage that exhibits a periodic polarity reversal to the opposite electrode;
a touch sensor part that is disposed on a surface of the display panel on a side of the opposite substrate, the touch sensor part having a plurality of sensor electrodes that exhibit a change in electrical characteristics when a contacting body comes into contact;
a sensor output read circuit that is sequentially connected to the sensor electrodes, the sensor output read circuit outputting a signal voltage based on the electrical characteristic of the sensor electrode connected thereto;
a sensor control circuit that supplies a control signal to the sensor output read circuit; and
a coordinate calculation circuit that detects a position where the contacting body has come into contact in the touch sensor part based on the signal voltage outputted from the sensor output read circuit,
wherein the control signal includes a signal that sequentially connects each of the sensor electrodes in the touch sensor part to the sensor output read circuit during one period of a vertical synchronization signal supplied to the display panel driver circuit, and
wherein the coordinate calculation circuit comprises: an averaging circuit that calculates an average value of signal voltage values outputted from the sensor output read circuit over two periods of the vertical synchronization signal; and a contact position detection circuit that detects the position where the contacting body has come into contact in the touch sensor part based on said average value.

2. The touch sensor-equipped display device according to claim 1, wherein the averaging circuit calculates the average value between a signal voltage outputted from the sensor output read circuit during a first period of the two periods of the vertical synchronization signal, and a signal voltage outputted from the sensor output read circuit during a second period of the two periods of the vertical synchronization signal.

3. The touch sensor-equipped display device according to claim 2, wherein the averaging circuit calculates the average value every two periods of the vertical synchronization signal.

4. The touch sensor-equipped display device according to claim 2, wherein the averaging circuit calculates the average value every one period of the vertical synchronization signal.

5. The touch sensor-equipped display device according to claim 1,
wherein the sensor electrodes include a first sensor electrode group in which a plurality of sensor electrodes are lined up in a first axis direction of coordinates in the touch sensor part, and a second sensor electrode group in which a plurality of sensor electrodes are lined up in a second axis direction of the coordinates in the touch sensor part, and
wherein the coordinate calculation circuit determines a first axis direction coordinate of the position where the contacting body has come into contact, based on the signal voltage outputted by the sensor output read circuit when a sensor electrode belonging to the first sensor electrode group is connected thereto, and determines a second axis direction coordinate of the position where the contacting body has come into contact, based on the signal voltage outputted by the sensor output read circuit when a sensor electrode belonging to the second sensor electrode group is connected thereto.

6. The touch sensor-equipped display device according to claim 1, wherein the polarity of the common voltage reverses every one horizontal period.

7. The touch sensor-equipped display device according to claim 1, wherein the polarity of the common voltage reverses every two horizontal periods.

* * * * *